(12) United States Patent
Burke et al.

(10) Patent No.: US 7,851,094 B2
(45) Date of Patent: Dec. 14, 2010

(54) POWER SUPPLY FOR PLUMBING DEVICE

(75) Inventors: David M. Burke, Taylor, MI (US);
William Schwingel, Saline, MI (US)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 12/025,004

(22) Filed: Feb. 2, 2008

(65) Prior Publication Data
US 2009/0197124 A1    Aug. 6, 2009

(51) Int. Cl.
*H01M 8/16* (2006.01)
(52) U.S. Cl. ..................... 429/401; 429/428
(58) Field of Classification Search ............ 429/2, 429/401
See application file for complete search history.

(56) References Cited

U.S. PATENT DOCUMENTS

| | | | |
|---|---|---|---|
| 3,635,764 A | | 1/1972 | Setser et al. |
| 4,085,254 A | | 4/1978 | Atkins |
| 5,702,835 A | | 12/1997 | Larue |
| 6,541,139 B1 | | 4/2003 | Cibuzar |
| 6,671,893 B1 | * | 1/2004 | Quintana et al. ............... 4/427 |
| 6,686,075 B2 | | 2/2004 | Gieshoff et al. |
| 6,929,876 B2 | | 8/2005 | Cibuzar |
| 6,934,977 B1 | * | 8/2005 | Quintana et al. ............... 4/427 |
| 7,082,959 B1 | * | 8/2006 | Franklin ..................... 137/312 |
| 7,160,637 B2 | | 1/2007 | Chiao et al. |
| 7,538,170 B2 | * | 5/2009 | Morikawa et al. ........... 526/247 |
| 2002/0033759 A1 | * | 3/2002 | Morello ..................... 340/605 |
| 2003/0138675 A1 | | 7/2003 | Cibuzar |
| 2004/0099607 A1 | * | 5/2004 | Leffler et al. ................ 210/704 |
| 2005/0208343 A1 | | 9/2005 | Kim et al. |
| 2005/0287658 A1 | * | 12/2005 | Williams ..................... 435/264 |
| 2006/0011491 A1 | | 1/2006 | Logan et al. |
| 2006/0159965 A1 | * | 7/2006 | Kibune et al. ................. 429/12 |
| 2007/0176774 A1 | * | 8/2007 | Jahrling et al. ......... 340/539.26 |
| 2007/0259217 A1 | | 11/2007 | Logan |
| 2008/0277273 A1 | | 11/2008 | Logan |
| 2008/0292912 A1 | | 11/2008 | Logan et al. |

FOREIGN PATENT DOCUMENTS

WO    WO0188284    * 11/2001

OTHER PUBLICATIONS

R. R. Angathevar Veluchamy, "Chemical Sensors and Instrumentation Powered by Microbial Fuel Cells", M. Sc. Thesis, Nov. 2007).*
Cheng, et al., "Increased Power Generation in a Continuous Flow MFC with Advective Flow through the Porous Anode and Reduced Electrode Spacing", Environmental Science & Technology, pp. 2426-2432, vol. 40, No. 7, 2006.
Oh, et al., "Proton Exchange Membrane and Electrode Surface Areas as Factors that Affect Power Generation in Microbial Fuel Cells", Appl. Microbiol Biotechnol, pp. 162-169, No. 70, 2006.
Liu, et al., "Electricity Generation Using an Air-Cathode Single Chamber Microbial Fuel Cell in the Presence and Absence of a Proton Exchange Membrane", Environmental Science & Technology, pp. 4040-4046, vol. 38, No. 14, 2004.
Liu, et al., "Production of Electricity During Wastewater Treatment Using a Single Chamber Microbial Fuel Cell", Environmental Science & Technology, pp. 2281-2285, vol. 38, No. 7, 2004.
Min, et al., "Electricity Generation from Swine Wastewater Using Microbial Fuel Cells", Water Research, pp. 4961-4968, vol. 39, 2005.
Oh, et al., "Hydrogen and Electricity Production from a Food Processing Wastewater Using Fermentation and Microbial Fuel Cell Technologies", Water Research, pp. 4673-4682, vol. 39, 2005.
Cheng, et al., "Increased Performance of Single-Chamber Microbial Fuel Cells Using an Improved Cathode Structure", Electrochemistry Communications, pp. 489-494; vol. 8, 2006.
Kim, et al., "Acclimating a Microbial Fuel Cell (MFC) for Electricity Generation Using Organics in Wastewater", Penn State University, 3 pages.

* cited by examiner

*Primary Examiner*—Patrick Ryan
*Assistant Examiner*—Ladan Mohaddes
(74) *Attorney, Agent, or Firm*—Carlson Gaskey & Olds PC

(57) ABSTRACT

An example arrangement for providing power includes a microbial fuel cell and a controller for supplying power to a plumbing component. The controller supplies power using power generated by the microbial fuel cell. An example method of powering a plumbing device includes providing wastewater to a microbial fuel cell and generating power with the microbial fuel cell. The method powers a plumbing device using the power generated by the microbial fuel cell.

17 Claims, 2 Drawing Sheets

POWER SUPPLY FOR PLUMBING DEVICE

BACKGROUND OF THE INVENTION

This application relates to using a microbial fuel cell to power a plumbing device.

Many plumbing devices rely on electrical power. For example, valves controlling flow within the plumbing device are typically initiated with electrical power. Many motion-controlled faucets also rely on electrical power. Batteries often supply electrical power to plumbing devices, especially in areas such as public restrooms. As known, replacing batteries is time consuming and can undesirably involve accessing rather constricted areas, such as underneath a sink or within a toilet tank.

SUMMARY

An example arrangement for providing power includes a microbial fuel cell and a controller for supplying power to a plumbing component. The controller supplies power using power generated by the microbial fuel cell. The controller may alter the power for use by the plumbing component. The arrangement may also include a storage unit for storing power from the microbial fuel cell or the controller. In such an example, the storage unit supplies power to the plumbing component, and the microbial fuel cell generates power to replenish the storage unit.

In another example plumbing arrangement, a microbial fuel cell generates power. A plumbing conduit provides wastewater to the microbial fuel cell. A plumbing device receives power from a controller. The controller alters power from the microbial fuel cell for use by the plumbing device.

An example method of powering a plumbing device includes providing wastewater to a microbial fuel cell and generating power with the microbial fuel cell. The method powers a plumbing device using the power generated by the microbial fuel cell. The method may include storing power generated by the microbial fuel cell and powering the plumbing device using the stored power, which is replenished with the power generated by the microbial fuel cell.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1:
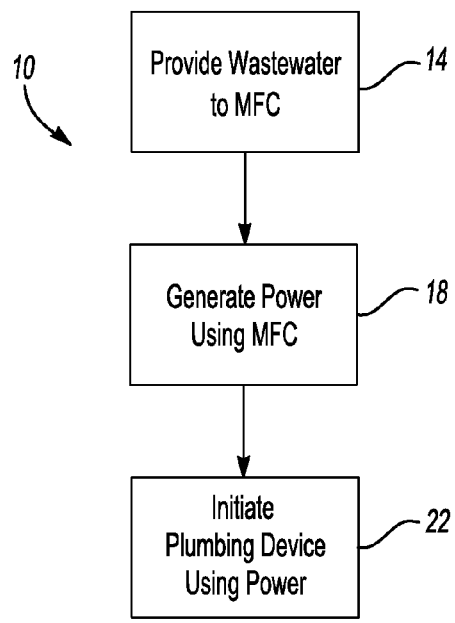
FIG. 1 shows an example method for powering a plumbing device.

As shown in FIG. 1, an example method of powering a plumbing device 10 includes providing wastewater to a microbial fuel cell (MFC) at 14. The microbial fuel cell generates electrical power at 18 using the wastewater. At 22, the electrical power generated by the microbial fuel cell is used to initiate a plumbing device.

Figure 2:
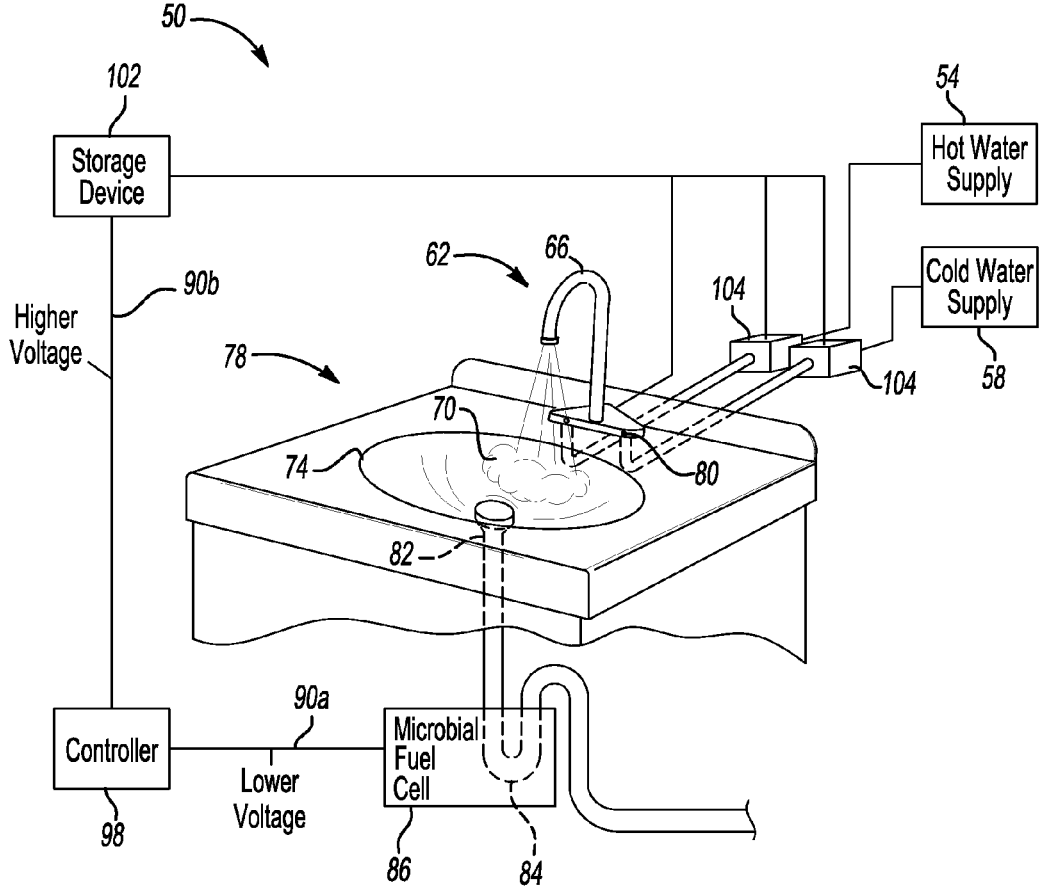
FIG. 2 shows a partial schematic view of an example plumbing arrangement powered by a microbial fuel cell.

Referring now to FIG. 2, an example plumbing arrangement 50, here a sink in a public restroom, utilizes the method 10 (FIG. 1) to provide electrical power. The plumbing arrangement 50 includes a hot water supply 54 and a cold water supply 58, which each provide water to a faucet assembly 62. In this example, the faucet assembly 62 includes a spout 66 for communicating water 70 to a sink basin 74 within a sink assembly 78.

Electrically powered sensors 80 initiate flow of water 70 through the spout 66 when the sensors 80 detect movement of a user's hand (not shown) near the sink basin 74. After use, wastewater moves from the sink basin 74 through a drain 82 in a known manner. The drain 82 communicates the wastewater to a septic system for example.

In this example, the drain 82 also communicates the wastewater through a microbial fuel cell 86 mounted adjacent the drain 82. Specifically, a trap portion 84 of the drain 82 is routed through the microbial fuel cell 86. When wastewater is moving through the drain 82, the wastewater flows from the trap portion 84 away from the sink assembly 78. As known, when wastewater is not moving through the drain 82, some stagnant wastewater remains in the trap portion 84. During such periods, the microbial fuel cell 86 generates power 90a in a known manner utilizing bacteria to generate electrical power from the oxidation of organic matter within the stagnant wastewater within the trap portion 84.

The power 90a generated by the microbial fuel cell 86 moves to a controller 98, which increases the voltage of power 90a to higher voltage power 90b. In one example, the controller 98 is a voltage converter. From the controller 98, the power 90b moves to a storage device 102. Power 90b is stored within the storage device 102 in a known manner. Example storage devices 102 include rechargeable batteries or capacitors. As needed, power 90b moves from the storage device 102 to power plumbing devices within the sink assembly 78.

The example storage device 102 stores power 90b from the controller 98 for periods of high demand. As power moves from the storage device 102, the microbial fuel cell 86 replenishes the supply through the controller 98 as wastewater collects in the trap portion 84. The controller 98 is used in this example because power 90a from the microbial fuel cell 86 is lower voltage than is suitable to power many plumbing devices. However, other examples may include moving the power 90a directly from the microbial fuel cell 86 to the plumbing devices, moving the power directly from the controller 98 to the plumbing devices, or both.

The example valves 104 for controlling flow from the hot water supply 54, and the cold water supply 58 to the faucet assembly 62 draw power from the storage device 102. The valves 104 are solenoid valves, which, when powered, actuate to control flow in a known manner. In another example, the sensors 80, another type of plumbing device, utilize power from the storage device 102. Other plumbing devices include leak detectors for example. Still other examples include flush valves within a toilet assembly, another type of plumbing arrangement.

Figure 3:
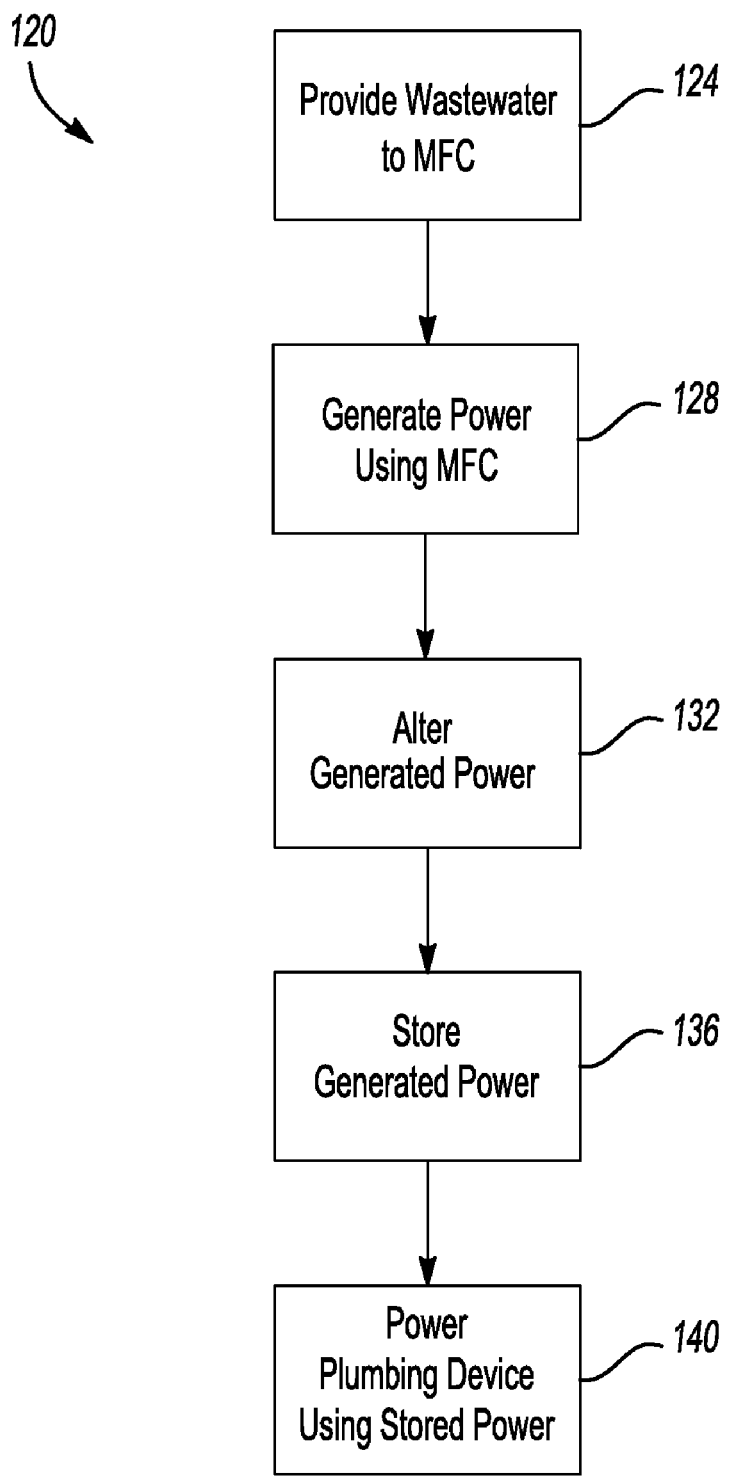
FIG. 3 shows another example method of providing power to a plumbing device.

FIG. 3 shows another example method 120 for powering a plumbing device. The method 120 first provides wastewater to a microbial fuel cell at 124 and generates power using the microbial fuel cell at 128 in a known manner. The method 120 then alters the generated power at 132 from the microbial fuel cell at 128. The controller 98 (FIG. 2) alters the power in one example. At step 136 the altered power is stored, and at 140 the plumbing device is powered using the stored power.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An arrangement for providing power, comprising:
a microbial fuel cell configured to receive a flow of wastewater; and
a controller for supplying electrical power directly to a plumbing component using electrical power generated by said microbial fuel cell, wherein the plumbing component is configured to influence the flow of wastewater to the microbial fuel cell; and wherein the arrangement further includes a storage unit electrically connected with said microbial fuel cell and said controller, said storage unit for storing electrical power generated by said microbial fuel cell.

2. The arrangement of claim 1, wherein said controller is configured to increase the voltage of electrical power generated by said microbial fuel cell for use by the plumbing component.

3. The arrangement of claim 1, wherein the plumbing component comprises a leak detector.

4. The arrangement of claim 1, wherein the plumbing component comprises a sensor.

5. The arrangement of claim 1, wherein the plumbing component controls flow.

6. The arrangement of claim 1, wherein the plumbing component comprises a solenoid valve.

7. The plumbing device of claim 1, wherein the microbial fuel cell receives wastewater directly from a sink drain pipe.

8. The arrangement of claim 1, wherein the microbial fuel cell generates electrical power using wastewater within a sink drain pipe trap.

9. A plumbing arrangement, comprising:
a microbial fuel cell for generating electrical power;
a plumbing conduit for providing wastewater to said microbial fuel cell;
a plumbing device configured to affect flow of wastewater through the plumbing conduit; and
a controller for altering electrical power from said microbial fuel cell for use by said plumbing device, wherein the microbial fuel cell is positioned adjacent the plumbing device within a dwelling area; and wherein the arrangement further includes an energy storage unit for storing electrical power from said microbial fuel cell.

10. The plumbing arrangement of claim 9, wherein said energy storage unit electrically powers said plumbing device.

11. The plumbing arrangement of claim 9, wherein said plumbing device controls flow to said microbial fuel cell or from said microbial fuel cell.

12. The plumbing arrangement of claim 9, wherein said plumbing conduit is a sink drain.

13. A method of powering a plumbing device, comprising:
(a) providing wastewater directly to a microbial fuel cell;
(b) generating electrical power with the microbial fuel cell using the wastewater and storing electrical power generated;
(c) powering a plumbing device using the electrical power; and
(d) moving the wastewater to a septic system after the generating.

14. The method of claim 13, including electrically powering the plumbing device with the stored electrical power.

15. The method of claim 13, wherein a sink drain provides wastewater in said step (a).

16. The method of claim 13, wherein the plumbing device is exclusively powered by the electrical power generated by the microbial fuel cell.

17. The method of claim 13, wherein the microbial fuel cell is located at a dwelling elevation.

* * * * *